United States Patent [19]
Mouche et al.

[11] Patent Number: 5,403,493
[45] Date of Patent: Apr. 4, 1995

[54] NONCORROSIVE SCALE INHIBITOR ADDITIVE IN GEOTHERMAL WELLS

[75] Inventors: Richard J. Mouche, Batavia; Eugene B. Smyk, Coal City, both of Ill.

[73] Assignee: Nalco Chemical Company, Naperville, Ill.

[21] Appl. No.: 988,883

[22] Filed: Dec. 10, 1992

[51] Int. Cl.⁶ .............................................. C02F 5/14
[52] U.S. Cl. .................... 210/697; 166/244.1; 166/310; 210/698; 210/699; 210/701; 210/747; 252/180; 422/13; 422/16; 422/17
[58] Field of Search ............... 60/641.2; 166/267, 310, 166/244.1; 210/696–701, 747; 252/175, 180, 181; 422/13, 12, 14, 16, 17

[56] References Cited

U.S. PATENT DOCUMENTS

| | | | |
|---|---|---|---|
| 4,269,717 | 5/1981 | Slovinsky | 210/750 |
| 4,756,888 | 7/1988 | Gallup et al. | 423/42 |
| 4,801,388 | 1/1989 | Fong et al. | 210/701 |
| 4,919,821 | 4/1990 | Fong et al. | 210/698 |
| 4,923,634 | 5/1990 | Hoots et al. | 252/389.2 |
| 4,931,188 | 6/1990 | Chen | 210/697 |
| 4,964,468 | 10/1990 | Adams et al. | 166/310 |
| 4,980,128 | 12/1990 | Cuisia et al. | 422/16 |
| 5,002,697 | 3/1991 | Crucil et al. | 252/389.23 |
| 5,035,806 | 7/1991 | Fong et al. | 210/701 |

OTHER PUBLICATIONS

"Calcium Carbonate Scale Control Geothermal Wells", M. Vaska, N. Kellog, Geothermal Resources Council Bulletin Aug./Sep. 1989, pp. 8–12.

"Characteristics of Scales from the Milos Geothermal Plant", A. J. Karabelas, N. Andritos, A. Mouza, M. Mitrakas, F. Vrouzi and K. Christanis, Geothermics, vol. 18 No. 1/2, pp. 169–174, 1989.

"Chemical Scale Inhibitors and their Properties for Geothermal Power Plants", R. J. Mouche, Training Seminar Geothermal Resources Council Meeting, Oct. 1991, 23 pages.

"Calcium Carbonate Scale Control", J. Lovekin, Training Seminar Geothermal Resources Council Meeting, Oct. 1991, 27 pages.

"Chemical Inhibition of Calcium Carbonate in Geothermal Wells and Power Plants", N. Kellogg, Training Seminar Geothermal Resources Council Meeting, Oct., 1991, 18 pages.

"Mechanism of Formation and Prevention of Calcium Carbonate Scale in Geothermal Applications", J. C. Monette, Training Seminar Geothermal Resources Council Meeting, Oct., 1991, 16 pages.

"Development of Effective Scale Control for Geothermal Production Wells", J. T. Rose, Geothermal Resources Council Bulletin Aug./Sep. 1989, pp. 5–7.

"Development of Scale Inhibition Technology for Geothermal Production Wells", J. B. Staub, S. M. Koeplin-Gall and R. J. Mouche, Geothermal Resources Council Bulletin Aug./Sep. 1989, pp. 13–15.

"Field Testing Results of Downhole Scale Inhibitor Injection", S. Pieri, F. Sabatelli and B. Tarquini, Geothermics, vol. 18, No. 1/2 pp. 249–257, 1989.

"Fluid Flashing and Formation Mineralization Near Producing Geothermal Wells: A Literature Review and Simulation", P. W. Johnson, Geopthermics, vol. 18 No. 1/2 pp. 161–167, 1989.

Geothermal Resources Council Bulletin, vol. 18, No. 8, Aug./Sep. 1989, 56 pages.

"Projects of the Geothermal Resources Association", K. P. Nemzer, Geothermal Resources Council Bulletin Aug./Sep. 1989, pp. 16–17.

*Primary Examiner*—Peter A. Hruskoci
*Attorney, Agent, or Firm*—Robert A. Miller; James J. Drake; Joan I. Norek

[57] ABSTRACT

An aqueous scale inhibitor product is corrosive to the elongated feed lines of a geothermal well due to the length of such feed lines, extended residence time of the product therein, and/or the elevated internal temperatures reached therein, and such corrosivity of aqueous scale inhibitor products is reduced when the scale inhibitor actives are no more than about 10 weight percent of the aqueous solution, when the pH of such aqueous solution is raised to the range of from about 5.5, or 8, to about 12, when carbohydrazide is added to such product, and by combinations of such factors.

8 Claims, 2 Drawing Sheets

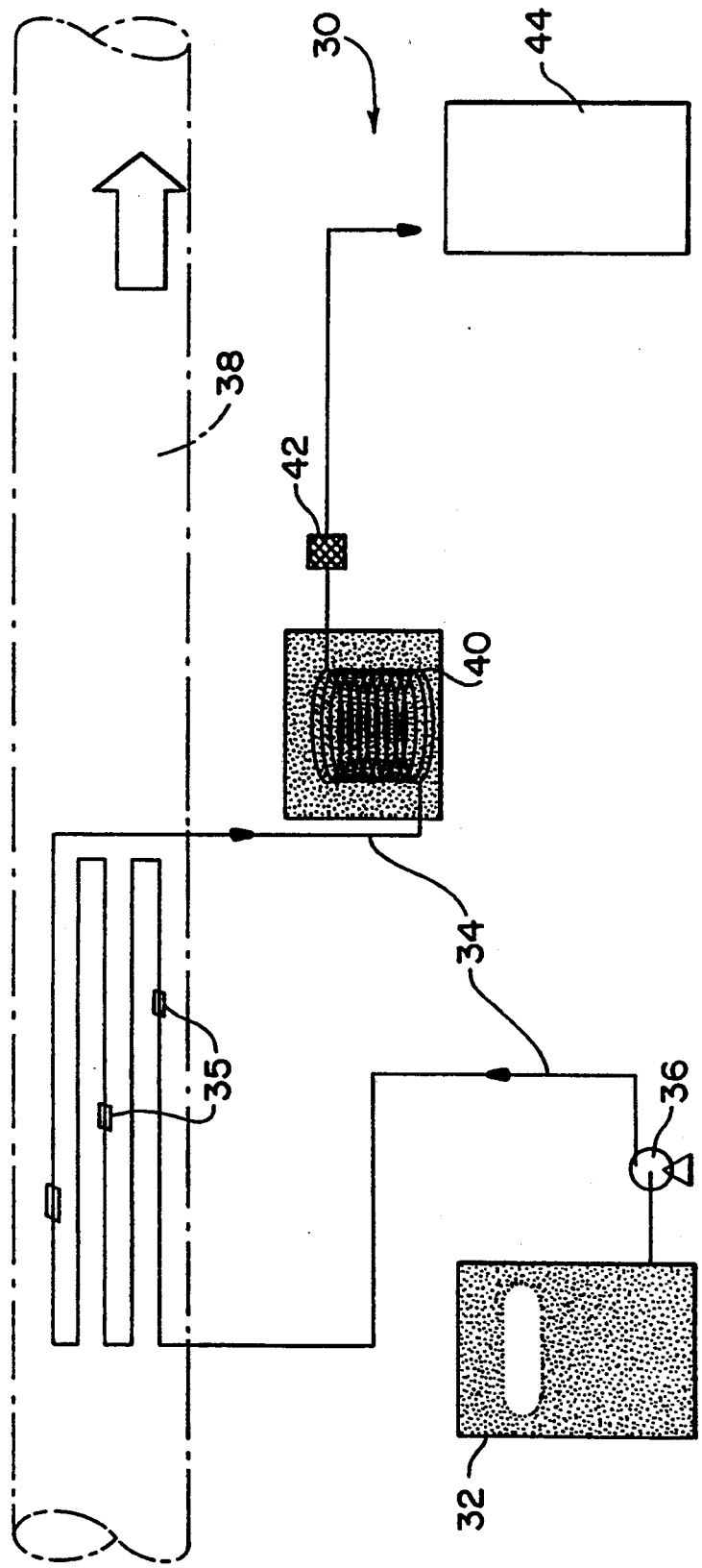

NONCORROSIVE SCALE INHIBITOR ADDITIVE IN GEOTHERMAL WELLS

TECHNICAL FIELD OF THE INVENTION

The present invention is in the technical field of scale inhibitors that are fed to the system to be treated under conditions that foster corrosion of the feed lines, and more particularly in the technical field of scale inhibitors for geothermal wells.

BACKGROUND OF THE INVENTION

Geothermal energy is energy in the form of heat within the earth's interior, which is tapped by geothermal wells. Since the earth's interior is extremely hot, there is an enormous potential energy supply in this heat, but there have been, and remain, many technical and economic challenges in optimizing the tapping of this energy source. The use of geothermal energy as an energy source, nonetheless, has gained in importance as other energy sources become less abundant and more expensive. Depending upon the salt content and application, geothermal fluids may be used directly or through a secondary fluid cycle.

Geothermal energy moves towards the earth's surface by thermal conduction through solid rock. Thermal energy can also be transmitted towards the earth's surface by movement of molten rock or by circulation of fluid ($H_2O$ as steam or water) through interconnected fractures and pores, which may provide heat reservoirs closer to the surface and thus a site more accessible to drilling for wells to tap geothermal energy. Geothermal wells are in any instance relatively deep wells.

Natural geothermal reservoirs, on which many commercial geothermal wells are located, are comprised of volumes of rock at high temperatures (up to about 350° C. or 622° F.) and often also of high porosity and high permeability to fluids. Wells are drilled into such a reservoir and the thermal energy in the rock is transferred by conduction to a fluid ($H_2O$ as water or steam), which subsequently flows to the well and then up to the earth's surface. In areas where the rock has a low porosity and permeability, it must be artificially fractured by means of explosives or hydrofracturing to provide a network of such fractures.

The thermal fluid within the fractures and pores of a reservoir may be almost entirely in a liquid state, which liquid state exists at temperatures much higher than the boiling point of water at atmospheric pressure because of the high pressure of overlying water. Such a reservoir is referred to as a liquid-dominated, or water-dominated, reservoir. When the thermal fluid within larger fractures and pores is in the form of steam, the reservoir is referred to as a vapor-dominated reservoir. A liquid-dominated reservoir may produce either water or a mixture of water and steam. A vapor-dominated reservoir routinely produces only steam, and in most instances the produced steam is super-heated steam. Water-dominated reservoirs are by far the more common type of reservoir.

In the geothermal production of electricity from a water-dominated reservoir, the pressurized hot water produced from a well is flashed to a lower pressure at the earth's surface, converting the water partly to steam, and this steam is used to drive a conventional turbine-generator set. In a relatively rare vapor-dominated reservoir, the superheated steam may be piped directly to the turbine without the separation of water. Direct use of geothermal energy as a source of heat is practiced in some geographic locations, but the predominant usage remains in the conversion of geothermal energy to electric energy.

Many geothermal wells for the production of electricity (a common use of geothermal energy) are water-dominated hydrothermal convection systems characterized by the circulation of surface water, including wastewaters and/or condensates downhole). The driving force of the convection systems is gravity, the cold downward-moving recharge water being much denser than the heated, upward-moving thermal water. The technique of reinjection of wastewaters or condensates back into the wells may be used for a number of reasons, including avoidance of surface disposal of such waters which may contain pollutants. Selective injection or reinjection of water into the thermal system may help to retain aquifer pressures and to extract more geothermal energy from the rock than is possible when fresh geothermal water is itself the main produced fluid. The produced fluid is either magmatic (released from solidifying magma), meteoric (rain and snow), or a mixture of the two, and may be fresh or reinjected or a mixture of the two.

Geothermal steam is generally used as the energy source, regardless of whether the produced fluid is steam, or partly steam, or the produced fluid is water which is partly converted to steam flash evaporation. Geothermal steam is used in power generation, heating and electrical processes. Geothermal steam temperatures range from about 185° C. to about 370° C. (about 365° F. to about 700° F.), and have a salinity from less than 1000 ppm to several hundred thousands parts per million, and a content of noncondensable gases up to about 6 percent. Geothermal steam power stations generating up to 250 MW have been built.

Mineral deposition is a major problem under the severe conditions encountered in the production of geothermal energy and can be a factor limiting the development of geothermal fields. Mineral deposition from the boiling geothermal fluid of a water-dominated reservoir is particularly a problem. Such mineral deposit problems are commonly the formation of calcium carbonate scale in wells or in the rock, although problems arising from other types of scale are known, for instance silica scale (mainly in re-injection wells). The scale-deposit problems are presently being countered primarily by the down-hole addition of scale inhibitor chemicals, although other techniques, such as acidizing the produced fluids, adding carbon dioxide under pressure thereto, and mechanical methods have been explored.

Scale inhibitors are routinely delivered downhole through long feed lines or tubings that run down through the well through which the hot produced fluids are moving upwardly. Under these conditions scale known inhibitors are extremely corrosive to ferrous metal feed lines, and it is well understood in the field of geothermal wells that the corrosive effect of scale inhibitors on the internal walls of feed lines is the primary cause of feed-line deterioration. Such feed lines are frequently now formed of tubes of highly resistant, and very expensive, alloys to resist the corrosion attack from within. These alloy tubes may even then be encased within mild steel tubing to prevent stress corrosion cracking and abrasion against the wall and/or the wellhead crown valve. The use of just the outer mild steel material is not possible presently because corrosion failure after a just a few days of use for delivering present scale inhibitors would be expected.

It is an object of the present invention to provide a scale inhibitor, particularly a scale inhibitor for geothermal wells, of reduced corrosivity. It is an object of the present invention to provide a scale inhibitor, particularly a scale inhibitor for geothermal wells, of such reduced corrosivity that it is relatively noncorrosive to mild steel. It is an object of the present invention to provide a method for delivering scale inhibitors downhole whereby the corrosivity of such scale inhibitors is reduced. These and other objects of the present invention are described in more detail below, as are the conditions promoting the inhibitor corrosivity problem and the problems created by such corrosivity.

BRIEF DESCRIPTION OF THE DRAWING

FIG. 2 is a geothermal well scale inhibitor corrosion evaluation system in diagrammatical form.

DISCLOSURE OF THE INVENTION

Figure 1:
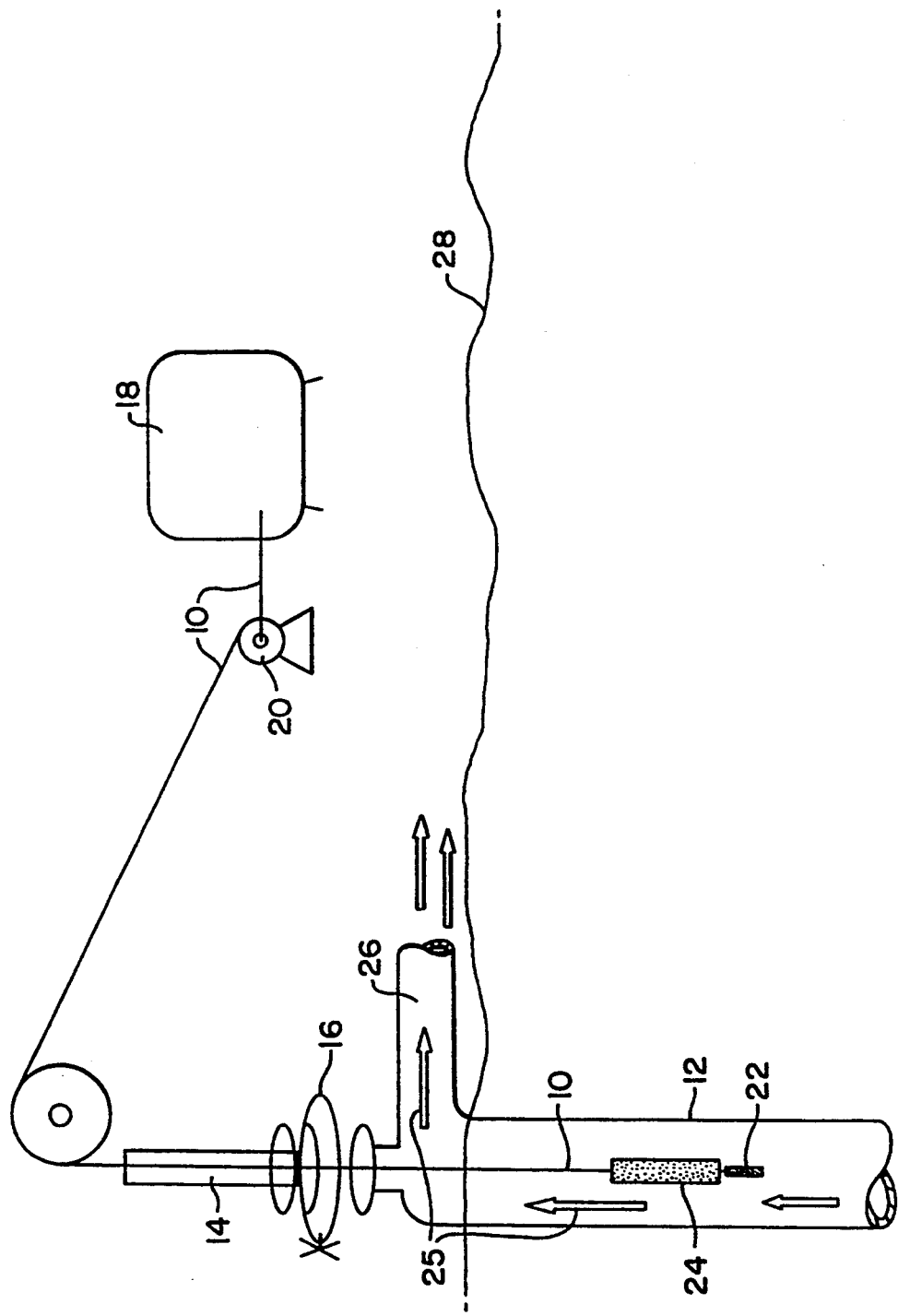
FIG. 1 is a geothermal well and scale inhibitor injection system in diagrammatical form.

The present invention provides a scale inhibitor composition, particularly a scale inhibitor composition for a geothermal well, comprising an aqueous solution of scale inhibitor actives having a pH within the range of from about 5.5 to about 12, and preferably from about 8 to about 12. The present invention also provides a scale inhibitor composition, particularly a scale inhibitor composition for a geothermal well, comprising an aqueous solution of scale inhibitor actives having a concentration of scale inhibitor actives of no more than about 10 weight percent. The present invention in a preferred embodiment provides a scale inhibitor composition, particularly a scale inhibitor composition for a geothermal well, comprising an aqueous solution of scale inhibitor actives and carbohydrazide having a pH within the range of from about 5.5 to about 12, and preferably from about 8 to about 12. In certain embodiments of the invention, such an aqueous solution of scale inhibitor actives is the scale inhibitor feed solution, that is, the formulation as feed to the feed line(s). The present invention provides a method of downhole delivery of scale inhibitor composition, particularly a scale inhibitor composition for a geothermal well, comprising delivering an aqueous solution of scale inhibitor actives having a pH within the range of from about 5.5 to about 12, and preferably from about 8 to about 12, downhole through an elongated feed line(s). The present invention provides a method of downhole delivery of scale inhibitor composition, particularly a scale inhibitor composition for a geothermal well, comprising delivering an aqueous solution of scale inhibitor actives and carbohydrazide having a pH within the range of from about 5.5 to about 12, and preferably from about 8 to about 12, downhole through an elongated feed line(s). In certain embodiments of the invention, the composition delivered downhole is an aqueous solution of scale inhibitor actives having a concentration of scale inhibitor actives of no more than about 10 weight percent. The present invention provides a method of downhole delivery of scale inhibitor composition, particularly a scale inhibitor composition for a geothermal well, comprising delivering an aqueous solution of scale inhibitor actives having a pH within the range of from about 5.5 to about 12, and preferably from about 8 to about 12, downhole through an elongated mild steel feed line(s).

Preferred Embodiments of the Invention

Scale inhibitor feed lines for geothermal wells are now generally formed of stainless steel or a highly corrosion-resistant alloy, such as certain alloys available under the Incoloy tradename from INCO Alloys International, to resist the corrosive effects of the scale inhibitors. Such feed lines are often then encased in mild steel tubing to prevent stress corrosion cracking of the primary feed lines and their abrasion against the walls of the wellbore and/or the wellhead crown valve. The feed lines pass through the upwardly-flowing production stream and are the tubes through which the scale inhibitors are pumped (injected) downhole to the site at which the scale inhibitors are released (injected) into the production stream. The fluids of the production stream are extremely hot, having temperatures on the order of from about 200° C. to about 260° C. (about 400° F. to about 500° F.), and the feed line temperatures likewise reach from about 200° C. to about 260° C. A scale inhibitor feed line typically must feed the scale inhibitor into the wellbore at a point that is from about 200 to about 400 feet below the lowest encountered scale formation site (generally the flash zone). This is to assure that the feed point is sufficiently ahead of the scale deposit area so that the inhibitor is adequately admixed in the production fluid when the first problem area is reached. A geothermal well itself routinely extends at least about 1 or 2 km (about 3,280 or 6,560 feet), and may be considerably deeper than this. Scale inhibitor feed lines that are from about 3,000 to about 5,000 feet long are not unusual. Scale inhibitor residence times in the feed lines are commonly of from about 20 to about 30 minutes or longer. The use of stainless steel or Incoloy alloy or other extremely corrosion-resistant tubing is extremely expensive for such an elongated line, and the costs of materials and installation are increased when an outer tubing of mild steel is needed for the protection of the inner tubing. Despite the expense of such materials, and at times such a concentric tubing system, the feed lines may require replacement every year or two, although feed lines that have been in service more than two years are known. When a concentric tube system is needed, it inevitably is of greater outer cross-section diameter ("O.D.") than would be required for a single-tube system, and hence it reduces the cross-section area of the wellbore that is available to the upwardly-moving production stream.

In more detail, and in reference to FIG. 1, a typical geothermal scale inhibitor feed line is comprised of a capillary tubing 10, usually having about a 0.15 inch to 0.25 inch O.D. (about 4.5 mm to 6.5 mm O.D.) with about a 0.015 to 0.035 inch wall (about 0.4 mm to 0.9 mm). This capillary tubing 10 is lowered into the well casing 12 through a lubricator bar 14 mounted on the wellhead crown valve 16 or through an expansion spool wing valve (not shown). The surface equipment required for scale inhibitor delivery usually is comprised of one or more inhibitor storage tanks 18, a high-pressure feed pump 20, which commonly is equipped with a metering gauge (not shown) to determine the scale inhibitor feed rate. The capillary tubing 10 is typically provided at its end with dispersion head 22 (a mixing chamber or injection head) and a weighted sinker bar 24. The capillary tubing 10, together with the sinker bar 24 and dispersion head 22, do not extend down to the bottom (not shown) of the well casing 12 (which is the usual, but not universal, position of the downhole end of the capillary tubing). The geothermal fluids (the flow of which is shown by the flow lines 25) are produced past the capillary tubing 10 until a produced stream outlet 26 is reached above the earth's surface 28.

A geothermal scale inhibitor capillary tubing is, as noted above, conventionally formed of stainless steel or a highly alloyed steel such as that available under the tradename of Incoloy 800 from INCO Alloys International. The use of an internally plastic-lined scale inhibitor feed line or the use of a feed line made of an alloy having a higher corrosion resistance (higher than that provided by Incoloy 800), has been suggested to alleviate to some degree the corrosivity of the scale inhibitors to the feed lines.

The present invention in certain embodiments provides single-tube scale inhibitor delivery system, preferably through a feed line comprised of a single mild steel tube. Mild steel tubing is known to withstand the conditions encountered on the outer surface of conventional scale inhibitor feed lines, at least for reasonable time periods. (Steam transfer piping and well casings are routinely made of mild steel. The present invention permits the interior surface of the scale inhibitor feed lines to be mild steel also, and hence a concentric tubing system may be replaced by a single tube. Regardless of whether a capillary tube system is formed of a single highly corrosion-resistant tubing or a concentric tubing system, the material and installation costs are so drastically reduced through the use of such a single tube system that the cost savings remain dramatic even if the replacement interval needs to be shortened, even substantially shortened. A feed line replacement interval of even 4 or 5 months time would be sufficient in duration to realize a substantial cost savings.

The single-tube mild steel feed line system of the present scale inhibitor feed method also advantageously permits a tube-system of relatively small O.D. to be employed. Although a single-tube feed line, which generally will have an O.D. of ¼ to ⅜ inches, may not have as small of a O.D. of the inner tube of a concentric tube feed line (typically ⅛ to ¼ inches), it may be formed with a smaller O.D. than the concentric tubes together (typically ¾ to 1¼ inches). The economic impact of such a smaller O.D. feed line can be far reaching. As noted above, the feed lines routinely pass through the upwardly-flowing production stream, and the amount of electricity produced is dependent in part on the amount of produced fluid per unit time. The scale inhibitor feed line(s) reduce the cross-sectional area of the wellbore available for the flow of the produced fluids. The wellbore itself may have a cross-section diameter on the order of from about 10 to about 20 inches. Both the scale inhibitor feed line(s) and the production stream flow path in substantially vertically. Thus the presence of a feed line diminishes the effective cross-section area of the production stream flow path by the area of its own cross-section. A narrower single-tube feed line increases the effective cross-section area of the production stream flow path, and increases the amount of produced fluid per unit time, and the electricity produced therefrom. The replacement of the concentric feed lines with the single tube feed lines of the delivery method of the present invention may, in some instances, save the millions of dollars in well-drilling costs. For instance, when one of a series of wells is depleted, the additional production permitted by the use of single-tube scale inhibitor feed lines may eliminate the need for an additional well to maintain the target electric energy production.

The scale inhibitors used downhole in geothermal wells are generally corrosive to the feed line unless a stainless steel or high alloy inner tubing is employed, but downhole scale inhibition treatment is nonetheless essential for most geothermal wells. The problem solved by the present invention is well recognized in the geothermal well field, which field differs from other fields which use scale inhibitors in geothermal well combination of the high temperature environment and the extreme length of the feed line(s). Outside of the present invention, the alleviation of the corrosive effects of the scale inhibitors in the geothermal field has been sought in more resistant tubing materials for a single or concentric tube system. The present invention departs from the present efforts by providing a scale inhibitor composition of at least reduced corrosivity.

Scale inhibitors are routinely supplied as aqueous solutions of scale inhibitor actives. Such solutions commonly contain from about 15 to about 70 weight percent actives. A solution containing about 70 weight percent actives is about as concentrated as commercially reasonable without undue viscosity problems. A solution containing about 15 weight percent actives is about as dilute as commercially reasonable, there being little to no practical value in shipping a product that contains more water. Scale inhibitors, as commercially supplied, are often within the narrower range of from about 20 to about 30 weight percent actives. In an embodiment of the invention, such aqueous solutions of scale inhibitors are introduced into the feed line of a geothermal well, for delivery downhole, at actives concentrations of no more than about 10 weight percent, and preferably less, such as no more than about 6 or 8 weight percent. Such low concentrations of actives may be provided by supplying the scale inhibitor product at such concentration, by dilution of a more concentrated scale inhibitor product prior to introduction into the feed line, by a water flush that sufficiently mixes with the scale inhibitor feed so as to provide the equivalent of a low concentration feed, or by other convenient means.

Regardless of the concentration of scale inhibitor actives in the aqueous solution that is charged to the feed line for delivery downhole, in an embodiment of the present invention there is provided a scale inhibitor solution having a reduced corrosivity by virtue of its pH which is preferably in the range of from about 8 to about 12. If for instance a water flush is employed to dilute the scale inhibitor solution at or close to the time of its introduction to the feed line, in this embodiment such flush should not take the pH of the scale inhibitor solution out of this range.

In a preferred embodiment of the invention, the basic material used in the aqueous scale inhibitor solution to adjust its pH value upwards is ammonia, although other bases can be employed, provided that they do not create an undue amount of precipitation from the solution.

In a preferred embodiment of the invention, the aqueous scale inhibitor solution also contains carbohydrazide (carbonic dihydrazide, $H_2NNHCONHNH_2$, FW 90.09, mp 157°–158° C.) in an amount effective to reduce the corrosivity of the scale inhibitor solution.

As noted above, the major scaling problem in the geothermal industry is calcium carbonate scale. Carbon dioxide is dissolved into the waters, particularly the sub-surface waters, forming carbonic acid, which in turn intensifies the dissolution of minerals in the formation, including calcite and other calcium carbonate containing compounds. The calcium carbonate concentration becomes supersaturated upon loss of carbon dioxide from the water, and carbon dioxide loss is driven by conditions routinely encountered in geothermal wells. When calcium carbonate scale deposits, regardless of whether in the well bore (commonly at the flash point) or in the separator at the surface, brine flow and/or steam flow is reduced and may be eventually halted. Steam flow reduction or interruption results in a power production and revenue loss. Calcium carbonate is routinely the predominant species found in geothermal scale deposits, in which it comprises routinely in excess of 50 weight percent of deposit material, and at times 90 weight percent or higher. Calcium carbonate scale inhibition is thus very important to the geothermal industry. The scale inhibitor species most commonly used in geothermal programs include polyphosphates, phosphonates and anionic polymers, particularly such as maleic acid polymers and their salts, (meth)acrylic acid polymers and their salts, sulfonated polymers such as polymers containing sulfonated styrene or sulfonated N-alkyl substituted (meth)acrylamide mer units and their salts, and polymers comprised of a plurality of anionic mer unit species. Phosphonates (organophosphorus compounds) are employed as crystal growth inhibitors or modifiers (threshold inhibitors which virtually increase the solubility of calcium carbonate by a mechanism not well understood). Two well known phosphonates for scale inhibition applications are aminomethylene phosphonate (AMP) and hydroxyethylidene-1,1 diphosphonate (HEDP). Low molecular weight, highly charged anionic polymers are employed as crystal lattice distortion agents, inhibiting the growth of calcium carbonate micro-crystals. Crystal growth inhibitors, crystal lattice distortion agents, and other scale inhibitors that increase the solubility of the calcium carbonate by influencing the morphology of the growing crystals, and thereby delaying precipitation, are at times referred to as "stabilizers", and their mechanism(s) as "stabilization". Larger anionic polymers are employed as dispersants, preventing calcium carbonate scale particles from agglomerating further, primarily by a charge repulsion mechanism. Such anionic polymers, as noted above, generally have carboxylic and/or sulfonic acid functionality. These species of inhibitors commonly are effective in sub-stoichiometric amounts. Scale inhibition agents that generally require stoichiometric dosages, such as chelants, may also be found in geothermal scale inhibition programs, although their use-cost is higher than agents functioning sub-stoichiometrically.

The scale inhibitors generally ionize to negatively charged species. The anionic group of the maleic acid and (meth)acrylic acid polymers is the carboxylate anion ($-COO^-$). The anionic group of sulfonic acid polymers is the sulfonate anion ($-SO_3^-$) and that of the phosphonates is the phosphonate anion ($-PO_3^-$). These and like anionic groups are the active sites in scale inhibition. The molecular weight of an anionic polymeric scale inhibitor is limited by a ceiling over which the species begins to so act as a bridging agent that the scale inhibition activity is lost due to the degree of flocculation activity exhibited by the agent. Any significant amount of bridging between scale particles will exacerbate, not inhibit, scale deposition. The molecular weight of an anionic polymeric scale inhibitor is also limited by a lower limit, below which the polymer's molecular weight is too low to provide effective crystal modification activity. Anionic polymeric scale inhibitors often have weight average molecular weights of less than about 10,000, although polymeric anionic (or highly polar) scale inhibitors having weight average molecular weights of 20,000 or higher, even up to about 80,000 or about 100,000, are available. Poly(meth)acrylic acid scale inhibitors commonly are within the weight average molecular weight range of from about 500, or 1,000, to about 20,000. Polymaleic acid scale inhibitors, which have the potential for a higher charge density than poly(meth)acrylic acid scale inhibitors, commonly are within the weight average molecular weight range of from about 500, or 700, to about 10,000. The molecular weight range of the anionic species in which scale inhibition activity is optimized is dependent upon a variety of factors, including without limitation the charge density, type and orientation of anionic sites, the existence of groups that sterically hinder the anionic sites, conformation of the species on a molecular level under the existing use environment, and the like. Thus the optimal weight average molecular weight range for scale inhibition is dependent upon the polymer's structural characteristics and at times the environment in which it is to function.

In traditional scale inhibition practice, a scale inhibition program commonly employs a multi-component inhibitor, for instance a phosphonate together with a polymeric crystal modifier/dispersant, although single active component products are also well known. In the geothermal industry scale inhibitor products must be delivered downhole to great depths, which typically are to depths below the flash zone of a well. Delivery of scale inhibitors to depths of 1,500 or 2,000 feet or more than 3,500 feet, is not uncommon in the geothermal industry. During such delivery a scale inhibitor is subjected to extremely high temperature environments for extensive time periods. This severe exposure to high temperature in the delivery system itself is virtually unique to the geothermal industry, as is the corrosion problem in the delivery system. Under these conditions, conventional scale inhibitors are themselves corrosive to the feed lines or breakdown to species that are corrosive to an undesirable degree in the typical geothermal delivery systems used for scale inhibitors. All-polymer programs, rather than a more traditional phosphonate/polymer program, have been suggested to reduce the corrosion problem, but the use of an all-polymeric scale inhibitor program frequently does not relieve corrosion problems in the delivery system(s).

The scale inhibitor actives employed in the present invention are generally employed in sufficient amount to provide an effective degree of scale inhibition, there of course generally never being a practical commercial reason for feeding a scale inhibitor downhole unless such scale inhibitor will control to some extent the downhole scale formation. The dosage of a scale inhibitor product effective to control downhole scale formation in the geothermal industry varies of course with the water or brine properties, the well peculiarities, temperatures, the scale inhibitor characteristics (including without limitation their molecular weight, their molecular weight distribution, charge density, the functional group providing the charge and the like), the concentration of scale inhibitor actives in the product and other variables. Maintenance dosages for some wells range from about 1 ppm or less to about 10 ppm, based on parts by weight of the scale inhibitor product per million parts by weight of the pre-flashing geothermal fluid to which it is being fed, and other wells require dosages of 15 to 20 ppm, or 30 to 40 ppm, same basis, or much higher, such as 100 or 200 ppm, may be required.

The composition of the present invention includes, and the method of the present invention employs, the scale inhibitor species most commonly used in geothermal programs, encompassing polyphosphates, phosphonates and anionic polymers, such as maleic acid polymers and their salts, (meth)acrylic acid polymers and their salts, sulfonated polymers such as polymers containing sulfonated styrene or sulfonated N-alkyl substituted (meth)acrylamide mer units and their salts, and polymers comprised of a plurality of anionic mer unit species. The composition of the present invention also includes, and the method of the present invention also employs, any scale inhibitor species that for cost-related or other reasons are now not commonly used in geothermal programs, but may eventually be employed therein. The composition of the present invention further includes, and the method of the present invention further employs, any scale inhibitor species for which a reduction in corrosivity of the product is desired, particularly a reduction in the corrosivity of such scale inhibitor product prior to its dispersion in the system being treated.

The scale inhibitor actives employed in the present invention are generally species that ionize to negatively charged species. The scale inhibitor actives employed in the present invention are generally species that have a sufficient anionic charge density, when ionized to negatively charged species, so as to effectively diminish the formation of scale deposits in aqueous system to which they are, or are to be, delivered. In one preferred embodiment the scale inhibitor actives are polymers that contain sites which can ionize to the carboxylate anion ($-COO^-$), the sulfonate anion ($-SO_3^-$), or combinations of such anionic sites. In more preferred embodiments, when the scale inhibitor actives comprise one or more species of such polymers, such polymer(s) have an anionic charge density of at least about 10 mole percent, and preferably at least about 20, or 25, mole percent of mer units containing at least one such anionic site, such mer units being a segment of the polymer(s) containing two backbone carbons. In another preferred embodiment, when the scale inhibitor actives comprise one or more species of such polymers, such polymer(s) have an anionic charge density of at least about 50 mole percent, and more preferably at least about 80, or 90, mole percent of mer units containing at least one such anionic site, such mer units being a segment of the polymer(s) containing two backbone carbons. In more preferred embodiments, when the scale inhibitor actives comprise one or more species of such polymers, such polymer(s) have an anionic charge density of at least about 10 mole percent, and preferably at least about 20, or 25, mole percent of mer units containing at least one such anionic site, such mer units being a segment of the polymer(s) containing two backbone carbons. The molecular weight of such anionic polymeric scale inhibitor is the molecular weight that provides a polymer having an effective scale deposit formation inhibition effect. The effective molecular weight of such anionic polymeric scale inhibitor is from about 500 to about 100,000, and in some preferred embodiments the polymeric scale inhibitor has a weight average molecular weight of less than about 10,000 or 20,000, particularly when anionic mer units of the scale inhibitor are predominantly (more than 50 mole percent) carboxylate anion containing mer units. In other preferred embodiments, the anionic mer units of a polymeric scale inhibitor have the chemical structure of Formula I:

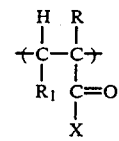

Formula I wherein R is hydrogen or methyl, $R_1$ is hydrogen or $-COX$ and X is $-OM$ or

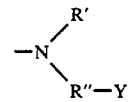

wherein M is hydrogen or another single-valent cation, such as sodium, potassium, ammonium, lithium, and the like, wherein R' is hydrogen or lower alkyl, and wherein R" is a lower alkyl, and wherein Y is sulfonate, (poly)hydroxy, (poly)carboxyl or carbonyl and combinations thereof. Such lower alkyl radicals include methyl, ethyl, propyl, isopropyl, butyl, sec-butyl, pentyl, iso-pentyl, hexyl and other isomers of these lower alkyls.

The polymeric scale inhibitor may have mer units other than anionic mer units, such as (meth)acrylamide mer units and (meth)acrylamide mer units containing lower alkyl substituents and the amide nitrogen, such as t-butyl (meth)acrylamide and other mer units that may be incorporated into the polymeric scale inhibitor without undue loss of the required scale inhibition activity and water solubility.

In other preferred embodiments, the scale inhibitor actives are comprised at least in part of phosphonates, such as those chemical structure of Formula II:

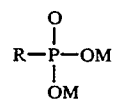

Formula II wherein M is hydrogen or another single-valent cation, such as sodium, potassium, ammonium, lithium, and the like, and wherein R is: lower alkyl having from about one to about six carbon atoms, which may contain substitutents other than hydrogen, for instance amino, hydroxyl, halide and other like substituents; or a mononuclear aromatic (aryl) radical, such as phenyl, which may contain substitutents such as hydroxyl, amino and lower alkyl substituents having from about one to about six carbon atoms. Such lower alkyl radicals include methyl, ethyl, propyl, isopropyl, butyl, sec-butyl, pentyl, iso-pentyl, hexyl and other isomers of these lower alkyls.

The scale inhibitor may also be an inorganic (poly)-phosphate, such as a coordinate phosphate ($Na:PO_4 < 3$) or a congruent phosphate ($2.6 < Na:PO_4 < 2.8$), or a chelant such as ethylenediamine tetraacetic acid (EDTA), nitriloacetic acid (NTA) and the like.

In certain embodiments the present invention is a scale inhibitor composition or feed of reduced corrosivity wherein the scale inhibitor actives comprise no more than 10 weight percent of the aqueous solution, and the reduction of the corrosivity of scale inhibitor products by dilution of a conventional aqueous scale inhibitor product is a surprising result, not predicted by the known effects of dilution of other corrosive materials for other applications. In preferred embodiments the concentration of the scale inhibitor actives is at least about 0.1 weight percent in the scale inhibitor composition or scale inhibitor feed, and it is believed that sufficient reduction of corrosivity will be provided when the scale inhibitor composition, as fed to the feed line(s), contains from about 0.1 to about 10 weight percent scale inhibitor actives, and thus there will be no practical benefit derived from the costs involved in feeding a more dilute solution. In preferred embodiment, such low concentration scale inhibitor composition or scale inhibitor feed has a pH value within the range of from about 5.5 to about 12, and preferably from about 8 to about 12 and/or contains carbohydrazide in an amount effective to further reduce the corrosivity of the scale inhibitor composition or scale inhibitor feed.

The present invention in a preferred embodiment is a scale inhibitor composition having reduced corrosivity comprising an aqueous solution containing scale inhibitor actives dissolved therein, such scale inhibitor actives comprising from about 0.1 to about 70 weight percent of that aqueous solution, having a pH value in the range of from about 5.5 to about 12, and preferably from about 8 to about 12, and in more preferred embodiment from about 8 to about 10 or about 12. In a preferred embodiment, such high pH scale inhibitor composition, or scale inhibitor feed, contains carbohydrazide in an amount effective to further reduce the corrosivity of the scale inhibitor composition or scale inhibitor feed and/or has a concentration of scale inhibitor actives of no more than about 10 weight percent.

The present invention in an embodiment is a scale inhibitor composition, or scale inhibitor feed, having reduced corrosivity comprising an aqueous solution containing scale inhibitor actives dissolved therein, such scale inhibitor actives comprising from about 0.1 to about 70 weight percent of the aqueous solution, and containing carbohydrazide in an amount effective to further reduce the corrosivity of the scale inhibitor composition or scale inhibitor feed. In a preferred embodiment, such scale inhibitor composition or scale inhibitor feed contains from about 0.01 to about 3 or 5 weight percent, and more preferably to about 1.0 weight percent, carbohydrazide based on scale inhibitor actives, and/or has a pH value in the range of from about 5.5, or about 8, to about 12, and/or has a concentration of scale inhibitor actives of no more than about 10 weight percent. In more preferred embodiments such scale inhibitor composition or scale inhibitor feed contains from about 0.02 to about 0.6 or 0.8 weight percent carbohydrazide based on scale inhibitor actives and/or a pH value of from about 8 to about 10. The present invention in a preferred embodiment is a scale inhibitor composition having reduced corrosivity comprising an aqueous solution containing scale inhibitor actives dissolved therein and from about 0.02 to about 3 or 5 weight percent, and more preferably to about 1.0 weight percent, carbohydrazide based on scale inhibitor actives wherein the concentration of said scale inhibitor actives is within the range of from about 0.1 to about 10 weight percent, based on the total weight of the composition, and in more preferred embodiments, from about 0.1 to about 0.5 or 0.6 weight percent carbohydrazide based on scale inhibitor actives and/or wherein the concentration of said scale inhibitor actives is within the range of from about 0.1 to about 8 weight percent, based on the total weight of the composition.

The present invention in a preferred embodiment is a scale inhibitor composition or scale inhibitor feed having reduced corrosivity comprising an aqueous solution containing scale inhibitor actives dissolved therein, such scale inhibitor actives comprising from about 0.1 to about 70 weight percent of the aqueous solution, and from about 0.02 to about 3 or 5 weight percent, and more preferably to about 1.0 weight percent, carbohydrazide based on scale inhibitor actives, having a pH value in the range of from about 5.5, or about 8 , to about 12, in which embodiment the combination of parameters is synergistic, reducing the corrosivity that otherwise would be demonstrated by the corrosion inhibitor actives to a degree that is greater than the additive effects of each parameter separately. In more preferred embodiment the present invention is such synergistic embodiment wherein the composition contains from about 0.1 to about 0.5 or 0.6 weight percent carbohydrazide based on scale inhibitor actives, and/or has a pH value in the range of from about 8 to about 10, and/or has a concentration of said scale inhibitor actives within the range of from about 0.1 to about 10 weight percent, based on the total weight of the composition. In all instances wherein the concentration of the component is expressed in terms of weight percentage of the aqueous solution or of the composition, the percentage is based on total weight of the aqueous solution or composition including all other additives thereto.

The present invention is also a method of downhole delivery of the scale inhibitor composition, in any of the above-described embodiments, comprising delivering such composition downhole through an elongated feed line(s) that is at least 100, and preferably at least about 400 or 500, feet in length, and in even more preferred embodiment at least about 1,000 feet in length, for instance from about 3,000 to about 5,000, or 6,000, feet in length. The present invention in another embodiment is a method of downhole delivery of the scale inhibitor composition, in any of the above-described embodiments, particularly a scale inhibitor composition for a geothermal well, comprising delivering such composition downhole through an elongated feed line(s) that is at least 100, and preferably at least about 400 or 500, feet in length wherein the internal temperature of such feed line is at least about 80° or 90° C., and preferably on the order of from about 150° C., or 200° C., to about 260° C. The present invention is also a method of downhole delivery of the scale inhibitor composition, in any of the above-described embodiments, comprising delivering such composition downhole a geothermal well to a point that is at least 100, and preferably 200, feet below the flash point of the well. The present invention is also a method of downhole delivery of the scale inhibitor composition, in any of the above-described embodiments, comprising delivering such composition through a feed line wherein the residence time of the composition in the feed line is at least about 20 minutes, for instance, from about 20 to about 30 minutes or longer, for instance up to about 60 or 90 minutes or more, depending on the depth of the well and the delivery rate. These various embodiments are generally considered preferred embodiments because under such stringent conditions the advantages provided by the present invention are extremely desirable.

The present invention in certain embodiments is also a method of downhole delivery of the scale inhibitor composition, in any of the above-described embodiments, comprising feeding it through single-tube feed line, preferably through a feed line comprised of a single mild steel tube (also known as "carbon steel" and as "coil tubing"). In another preferred embodiment, such single-tube (preferably of mild steel) feed line will have an O.D. of from about ¼ to about ⅝ or ¾ inches.

Closed Pressure Bomb Corrosion Test Method

The following Closed Pressure Bomb Corrosion Test Method was employed in the following Example 1 to determined the corrosion rate in test specimens held immersed in scale inhibitor solutions for the test duration. The corrosion rates are reported in terms of mils (of lost metal) per year (mpy), were determined from the weights of the test specimens, as cleaned, before and after the test period. The test specimens were thin mild steel rods, embedded in teflon which were immersed in an aqueous scale inhibitor solution in closed pressure-bombs. The pressure-bombs were held in an oven having an elevated temperature of about 450° F. (about 323° C.), without stirring or other agitation for test periods of from about 48 to about 72 hours. In all instances the specimens were acid cleaned and dried before pre-immersion weighing, and upon removal from the test solution the specimens were acid cleaned and dried, and then reweighed. The volumes of the scale inhibitor solutions were uniform for all tests, and the determinations of corrosion rates in mpy eliminates the differences in the extent of corrosion based on variations in test durations.

Room Temperature Corrosion Test Method

The Room Temperature Corrosion Test Method was employed for the tests reported in the following Example 2. The test temperature was about 70° F. (room temperature or about 21° C.), the test specimens were standard mild steel corrosion coupons immersed in aqueous scale inhibitor solutions in beakers, with constant agitation (stirring), and the test period for each test was approximately one week period. Some room temperature tests were conducted in open beakers, and some in closed beakers, as indicated in the description in Example 2. In all instances the specimens were acid cleaned and dried before pre-immersion weighing, and upon removal from the test solution the specimens were acid cleaned and dried, and then reweighed. The volumes of the scale inhibitor solutions were uniform for all tests, and the determinations of corrosion rates in mpy eliminates the differences in the extent of corrosion based on variations in test durations.

Scale Inhibitor Products A and B

In the following Example 1 and Example 2, two scale inhibitor products that are currently used in the geothermal industry were employed to illustrate the efficacy of the present invention. The products are designated Scale Inhibitor Product A and Scale Inhibitor Product B. Both are polyacrylic acids and have comparable polymer actives concentrations in aqueous solutions. Both have weight average molecular weights in the range of from about 1,000 to about 5,000. Both have a pH value as supplied of from about 4 to about 5, and are routinely used in the geothermal industry by injection downhole neat, as are other scale inhibitor products.

Example 1

Using the Closed Pressure Bomb Corrosion Test Method described above, a series of tests, designated Tests 1 through 13, were conducted. In Test 1, the test specimen was immersed in neat Scale Inhibitor Product A as commercially supplied, and was determined to be highly corrosive under the test conditions of the Closed Pressure Bomb Corrosion Test Method. In Tests 2 through 13, the test specimens were immersed in modified scale inhibitor solutions using either Scale Inhibitor Product A or B. The modifications comprised pH adjustment, using ammonia, the addition of varying amounts of carbohydrazide, dilution of the Scale Inhibitor Products by a factor of 5 (20 parts of the Scale Inhibitor Product diluted to 100 parts, by weight), and various combinations of such modifications. The Scale Inhibitor Product employed and the modifications made to the Scale Inhibitor Product are identified below in Table 1, together with the tests results in terms of corrosion rates. The test durations were: 43 hours for Test 13; 48 hours for Tests 7 and 10–12; 68 hours for Test 6; 70 hours for Tests 1–4; and 72 hours for Test 4.

TABLE 1

| | | Closed Pressure Bombs-450° F. | | |
|---|---|---|---|---|
| Test No. | Scale Inhibitor Product | pH Adjustment | Carbohydrazide Dosage (wt. % based on scale inhibitor actives) | Dilution Factor | Corrosion Rate (mpy) |
| 1 | A | none | none | none | 1,289 |
| 2 | A | none | 0.02% Carbohydrazide | none | 1,184 |
| 3 | A | none | 0.1% Carbohydrazide | none | 1,038 |
| 4 | A | none | 0.2% Carbohydrazide | none | 1,208 |
| 5 | A | to 5.7 | none | none | 425 |
| 6 | A | to 8.3 | none | none | 658 |
| 7 | A | to 8.3 | none | 5 | 138 |
| 8 | A | to 8.3 | 0.2% Carbohydrazide | none | 571 |
| 9 | A | to 8.3 | 0.2% Carbohydrazide | 5 | 95 |
| 10 | B | none | none | 5 | 68 |
| 11 | B | 9.3 | none | 5 | 58 |
| 12 | B | none | 0.2% Carbohydrazide | 5 | 58 |
| 13 | B | 9.3 | 0.2% Carbohydrazide | 5 | 8 |

As seen from Table 1 above, under the conditions of this test the neat commercial scale inhibitor product is highly corrosive to mild steel (Test 1). The corrosivity of the scale inhibitor is significantly reduced by adjusting the pH to the range of from about 8 to about 12, as is demonstrated for a neat Scale Inhibitor Product (Tests 5 and 6 versus Test 1), for carbohydrazide-treated neat Scale Inhibitor Product (Test 8 versus Test 4), for a diluted Scale Inhibitor Product (Test 11 versus Test 10), and for a diluted carbohydrazide-treated Scale Inhibitor Product (Test 13 versus Test 12). The corrosivity of the scale inhibitor is reduced by the addition of carbohydrazide, as is demonstrated for a both a neat Scale Inhibitor Product having an adjusted pH (Test 8 versus Test 5) and for a diluted Scale Inhibitor Product without a pH adjustment (Test 9 versus Test 7), and is remarkably reduced for a diluted Scale Inhibitor Product having an adjusted pH (Test 9 versus Test 7 and Test 13 versus Test 11). Further the Scale Inhibitor Product modification combination of both adjusting the pH to the 8 to 12 range and adding carbohydrazide is shown to have a synergistic effect on the corrosivity reduction for both neat and diluted Scale Inhibitor Products (Test 8 versus Tests 1, 4 and 6, and Test 13 versus Tests 10, 11 and 12).

Example 2

The Room Temperature Corrosion Test Method described above was employed to determine the effect of adding a variety of corrosion inhibitors and oxygen scavengers, in comparison to carbohydrazide addition, on the corrosivity of the Scale Inhibitor Products, under the open beaker condition, and the difference in corrosivity of the Scale Inhibitor Product under the closed beaker condition, with and without carbohydrazide. None of the test samples were diluted or adjusted in pH other than any dilution or pH modification that occurred by virtue of the addition of the additive. The additives and dosages thereof, together with the test results, are set forth below in Table 2, where it is demonstrated that under the closed beaker/room temperature condition, the Scale Inhibitor Product was virtually noncorrosive to mild steel and the addition of 0.02 and 0.04% carbohydrazide (based on scale inhibitor actives) to the Scale Inhibitor Product promoted corrosion. Also shown by the test results in Table 2 is that, under on open beaker condition, where the Scale Inhibitor Product is somewhat corrosive to mild steel, carbohydrazide reduced such corrosivity, while phosphate alone, phosphate in combination with zinc, and sodium sulfite all increased the corrosion.

tion study, which was conducted using a test system as shown in FIG. 2. The test system is comprised of a geothermal scale inhibitor corrosion evaluation system ("evaluation system"), designated in FIG. 2 generally by the reference numeral 30. The evaluation system 30 is comprised of product feed container 32 having a 25-gallon capacity and a feed line 34, the feed line 34 being 0.25 inch ID pressure tested wall mild steel tubing with a plurality of removable tubing specimens 35. The feed line 34 first runs to a metered pump 36, which in the instance of the present study was a MiltonRoy Centrac pump, then to a geothermal fluid transfer pipe 38, which pipe 38 is in contact with 50 feet of the feed line 34, then through a cooling bath 40, through a back pressure valve 42 (500 psig) to a collector container 44. The 50 feet of feed line 34 placed against the geothermal fluid transfer pipe 38 (through which hot produced geothermal fluid is constantly flowing), together with the back pressure valve 42, provides a reasonable simulation of the temperature and pressure conditions that would be encountered upon delivery of the scale inhibitor downhole of a geothermal well. The scale inhibitor composition, described below, was fed through the feed line 34 of the evaluation system 30, from the product feed container 32 through to the collector container 44, at a flow rate of about 2 ml per minute, which provided a detention time of the composition in the 50 coiled feet of feed line 34 of about 24 hours. The composition was comprised of an aqueous solution containing about 4.6 wt. % of a polyacrylate actives (described and identified above as Scale Inhibitor Product A), about 0.12 wt. % carbohydrazide actives (about 2.6% carbohydrazide based on polyacrylate), sufficient ammonia to adjust the pH to a value between 9 and 10, using the geothermal fluid condensate or other water routinely used for dilution by the geothermal installation on which site the evaluation was conducted. The flow of the scale inhibitor composition was commenced and the test continued for a time period of about 40 days (during which time hot produced geothermal fluids were intermittently flowing through the geothermal fluid transfer pipe 38 in the direction of the flow lines shown therein), after which the flow of the scale inhibitor composition was terminated and the evaluation system 30 was disassem-

TABLE 2

| Test No. | Open or Closed Beaker | Scale Inhibitor Product | Additive Dosage (wt. % based on scale inhibitor actives) | Corrosion Rate (mpy) |
| --- | --- | --- | --- | --- |
| 14 | Open | A | none | 14.1 |
| 15 | Open | A | 0.02% Carbohydrazide | 11.5 |
| 16 | Open | A | 0.1% Carbohydrazide | 0.6 |
| 17 | Open | A | 0.2% Carbohydrazide | 0.6 |
| 18 | Closed | A | none | 0.4 |
| 19 | Closed | A | 0.02% Carbohydrazide | 0.4 |
| 20 | Closed | A | 0.1% Carbohydrazide | 7.6 |
| 21 | Closed | A | 0.2% Carbohydrazide | 6.7 |
| 22 | Open | A | none | 19 |
| 23 | Open | A | 0.2% PO$_4$ | 50 |
| 24 | Open | A | 0.2% Zn | 17 |
| 25 | Open | A | 0.2% PO$_4$ + 0.2% Zn | 43 |
| 26 | Open | A | 0.05% Carbohydrazide | 9.7 |
| 27 | Open | A | 0.1% Erythorbic Acid | 8.2 |
| 28 | Open | A | 0.1% Sodium Sulfite | 168 |

Example 3

The efficacy of the scale inhibitor composition and method of the present invention was further demonstrated by the following geothermal well on-site evaluabled. After such termination, the feed line 34 was examined at a plurality of removable sections (the test specimens 35) for corrosion, and it was determined that the corrosion rate therein was about 1.7 mpy. At no time was the flow of scale inhibitor composition lost due to plugging of the feed line 34 with product deposits. The flow of scale inhibitor composition was stopped up to three days, which modeled/simulated static product behavior for shut-in wells with no product feed.

By scale inhibitor actives is meant herein the dry weight of the component(s) of the aqueous composition that have scale inhibition activity, regardless of whether the nature of that activity is of threshold inhibition, crystal growth inhibitors, crystal lattice distortion, stabilization, dispersion and the like. By scale inhibitor feed is meant herein the composition or formulation that contains the scale inhibitor actives as that composition or formulation is introduced into the feed line. Geothermal wells routinely have a check valve at the downhole end of all scale inhibitor feed lines, and the scale inhibitor composition when being fed down such feed lines are under pressures that are higher than atmospheric pressures, and such scale inhibitor compositions generally will remain liquid despite the elevated temperatures that are reached internally within such feed lines. Unless expressly indicated otherwise herein, all percentages are weight percentages.

Industrial Applicability of the Invention

The present invention is applicable to the geothermal industry and any other industry wherein aqueous scale inhibitor compositions are fed to an aqueous system through elongated feed lines under conditions creating corrosivity problems to such feed lines.

We claim:

1. A method of delivering a scale inhibitor composition to a downhole aqueous system of a geothermal well through an elongated feed line having a length of at least 100 feet and an internal temperature of at least about 80° C., comprising feeding an aqueous solution of scale inhibitor having a concentration of said scale inhibitor of no more than about 10 weight percent through said elongated feed line, wherein said scale inhibitor is a polymer which can ionize to carboxylate anion (—COO$^-$), sulfonate anion (—CO$_3^-$), or combinations of such anionic sites, and said aqueous solution has a pH value of from about 8 to about 12, and includes an amount of carbohydrazide effective to reduce the corrosivity of said aqueous solution in said elongated feed line.

2. The method of claim 1 wherein said elongated feed line is formed of mild steel capillary tubing.

3. The method of claim 1 wherein said elongated feed line is at least about 1,000 feet in length.

4. The method of claim 1, wherein said elongated feed line is at least about 500 feet in length wherein the internal temperature of such feed line is from about 150° C. to about 260° C.

5. The method of claim 1 wherein the residence time of said scale inhibitor in said feed line during said delivery is at least about 20 minutes.

6. The method of claim 1 wherein said concentration of said scale inhibitor is within the range of from about 0.1 to about 10 weight percent, based on the total weight of said aqueous solution.

7. The method of claim 1 wherein the carbohydrazide is present in the aqueous solution in an amount of from about 0.01 to about 5 weight percent carbohydrazide.

8. The method of claim 1 wherein said aqueous solution is further comprised of organophosphonate, polyphosphate, or chelant or combinations thereof.

* * * * *

UNITED STATES PATENT AND TRADEMARK OFFICE
CERTIFICATE OF CORRECTION

PATENT NO. : 5,403,493
DATED : APRIL 4, 1995
INVENTOR(S) : RICHARD J. MOUCHE, EUGENE B. SMYK

It is certified that error appears in the above-indentified patent and that said Letters Patent is hereby corrected as shown below:

CLAIM 1, COLUMN 18, LINE 6 anion (-COO-), sulfonate anion (-CO$_3$-), or combi-

LETTERS PATENT SHOULD READ AS:

anion (-COO$^-$), sulfonate anion (-SO$_3^-$), or combi-

Signed and Sealed this

Sixth Day of June, 1995

Attest:

BRUCE LEHMAN

Attesting Officer

Commissioner of Patents and Trademarks